Dec. 28, 1948.   W. D. VAN DYKE ET AL   2,457,616
METAL FOIL TYPE STRAIN GAUGE AND METHOD OF MAKING SAME
Filed July 16, 1946   2 Sheets-Sheet 1

INVENTOR.
WILLIAM D. VAN DYKE
PAUL A. DENNIS
BY
Edwin Coates
ATTORNEY

Dec. 28, 1948. W. D. VAN DYKE ET AL 2,457,616
METAL FOIL TYPE STRAIN GAUGE AND METHOD OF MAKING SAME
Filed July 16, 1946 2 Sheets-Sheet 2

INVENTOR.
WILLIAM D. VAN DYKE
BY PAUL A. DENNIS
Edwin Coates
ATTORNEY

Patented Dec. 28, 1948

2,457,616

UNITED STATES PATENT OFFICE 2,457,616

METAL FOIL TYPE STRAIN GAUGE AND METHOD OF MAKING SAME

William D. Van Dyke, Tarzana, and Paul A. Dennis, Manhattan Beach, Calif., assignors to Douglas Aircraft Company, Inc., Santa Monica, Calif.

Application July 16, 1946, Serial No. 683,813

15 Claims. (Cl. 201—63)

This invention relates to measuring instruments and more particularly to a gauge for measuring the strain effects in elements or parts subjected to forces tending to produce strain therein.

The gauge of the present invention comprises, in the broadest aspects thereof, a resistance element to be mounted to the member subjected to the strain comprising a thin substantially zigzag strip of conducting material whose electrical resistance varies in accordance with changes of strain therein. The electrical resistance of the zigzag strip is known so that when the strip is connected to some electro-responsive means which will measure the changes in the electrical resistance, the stresses imparted to the body member may be calibrated or evaluated in accordance with the change of resistance.

It has been heretofore proposed to form resistance type strain gauges by mounting to a backing member a grid of very small gauge resistance wire. The resistance wire after it was formed or wound into the grid was cemented to the backing member by some suitable adhesive to the end that stresses exerted on the backing member would be transmitted through the adhesive to the wire. These previously proposed instruments were difficult to fabricate for the fine resistance wire used to form the grid was difficult to handle and could be easily damaged during the grid-forming operation as well as during the operation of cementing the grid to the backing member. These inherent defects complicated the fabrication of the prior instruments and increased the manufacturing cost thereof.

The present invention obviates these difficulties for the resistance element of the gauge is formed by removing elongate portions from a thin sheet of conducting material to form an elongate path of resistance having a substantially zigzag course. The portions of the sheet removed may be cut therefrom by a stamping operation through the use of a suitable die. The forming operation is, therefore, relatively simple and as the gauges can be mass produced the actual manufacturing cost of the same is relatively low as compared to the cost of forming the previously proposed instruments wherein the grid is made up of a fine resistance wire.

In the one form of the invention herein illustrated the grid or resistance element is formed by removing material of the desired shape from individual or separate sheets of material. In this form of the invention the resistance element may be formed with enlarged terminal portions to which the leads may be soldered or otherwise electrically connected.

In another embodiment of the method herein described the resistance element is produced by forming a plurality of substantially parallel slots alternately opening on opposite edges of a thin sheet of conducting material. The portion of the sheet remaining after the forming operation has a substantially zigzag shape and forms the elongate path of resistance.

Another method of forming the resistance element comprises forming a plurality of rows of substantially parallel overlapping slots in a band of conducting material. The band may thereafter be transversely severed to form a plurality of resistance elements having an elongate path of resistance with a substantially zigzag course. The band may be stored in roll form and individual resistance elements severed from the band as required.

The resistance elements formed by the stamping operations in any of the above described forms of the method of the present invention are self-supporting and therefore need not be mounted to a backing or supporting member. In one embodiment of the present invention, however, the thin zigzag strip of material, after suitable lead wires are attached to the opposite ends thereof, has applied to at least one face thereof some suitable insulating material which not only reinforces the element but also forms an intermediate layer for insulating the resistance element from the part to be tested when the gauge is mounted thereon.

The resistance element need not be coated with the insulating material for the element can be insulated from the test part when the gauge is mounted on the same. In this use of the gauge the resistance element may be secured to the test part by a material which also serves to insulate the resistance element from the part undergoing test. The material may if desired be one which has a melting temperature in excess of the temperature to be attained by the test part so that the resistance element may be insulatedly bonded to the test part by melting the material while the same is in contact with the part as well as the element.

Other features and advantages of the present invention will be apparent from the following description of the present invention taken in connection with the accompanying drawing in which.

Figure 1:
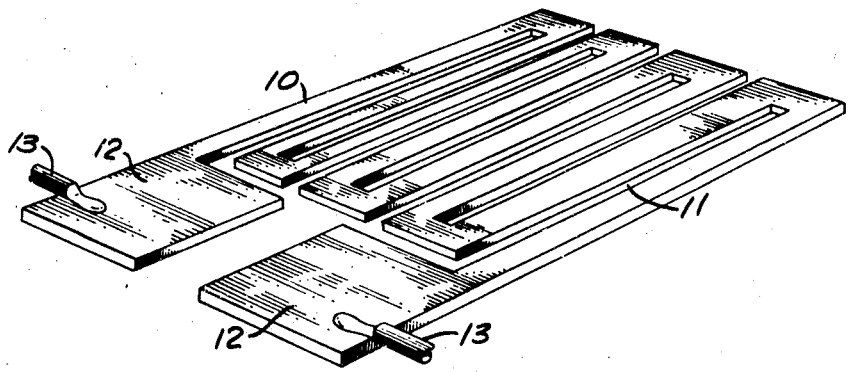
Figure 1 is a perspective view of one form of the gauge of the present invention.

The gauge of the present invention, referring now to the embodiment of the invention shown in Figure 1, comprises a body member 10 formed of some conducting material the resistance of which varies in accordance with changes in the strain therein. The body or resistance member of the gauge is formed by removing elongate strips from a sheet to form, as shown, a plurality of substantially parallel slots 11. The portion of the sheet remaining provides an elongate path of resistance having a substantially zigzag course.

The portions of the sheet may be removed therefrom by any means desired, although it has been found that these portions may be easily punched from the sheet by a suitably shaped die. The punching operation is relatively fast and the resistance elements can thus be mass produced at a relatively low cost.

In the embodiment of the gauge shown in Figure 1, the opposite ends of the resistance path are formed with enlarged terminal portions 12 to which the bared ends of suitable lead wires 13 may be attached.

The gauge thus formed is self-supporting and can be used without any backing material such as is now used with the type of resistance gauge having a grid formed of extremely fine resistance wires.

Figure 5:
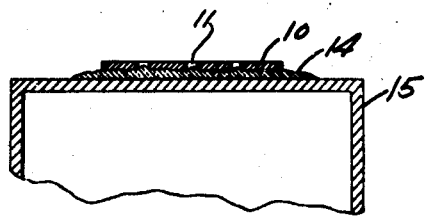
Figure 5 is a sectional view showing the form of the gauge illustrated in Figure 4 mounted on the test part.

The gauge, when mounted to the part undergoing tests, must be electrically insulated from the part so that the gauge can be adhesively bonded to the test part by a material which also insulates the resistance element from the test part. Where the test part is heated to relatively high temperatures in use, the material used may be similar to that used to mount the gauge shown in the co-pending application Serial No. 607,032 of William D. Van Dyke. The materials there used are of the types generally designated by the terms "ceramic" and "vitric," which terms cover in the broadest sense materials capable of being fused or cured at elevated temperatures. Examples of such materials are vitreous enamels, vitreous cements, powdered glass compositions, certain clays, or similar frits or frit-like materials. For the purpose of clarity, the material used to mount the gauge shown by Figure 1 of the drawing will be hereinafter designated as a frit.

Where a frit is used the gauge of Figure 1 may be mounted to the test part as shown in Figure 5. To thus mount the gauge a mass 14 of the frit is placed on the test part 15 after which the same can be heated as by projecting a flame thereagainst to cause the frit to become molten. The gauge is then placed upon the mass or layer of molten frit and the frit allowed to cool and harden. Care should be taken to insure that the resistance element is separated from the test part by a layer of the frit as the grid must be insulated from the test part. If desired, an additional amount of the frit may be deposited over the resistance element and this frit melted to cause the same to flow about and completely cover the element.

Where the gauge is mounted to the test part by a frit which must be heated to a relatively high temperature, the leads 13 cannot be soldered to the body of the gauge as the soldered connection obviously would be destroyed during the operation of melting the frit. In such use of the gauge the bared ends of the leads 13 could be spot welded to the resistance element.

Where the test part is not heated in use any suitable adhesive material can be used to bond the resistance element to the test part. To obviate the use of some separate insulating material the adhesive should be one which will also insulate the resistance element from the test part.

Figure 2:
Figure 2 is a sectional view of another form of the gauge in which the resistance element of the gauge shown in Figure 1 is used.

Although the gauge illustrated in Figure 1 is self-supporting and need not be reinforced by a backing member, it may be desired to coat the resistance element with some insulation material which will also protect the gauge during storage and handling. Such a gauge is shown in section in Figure 2 wherein the resistance element is indicated by the reference character 16. The insulation material 17 applied to the element 16 may be of any desired thickness as long as the film or coat of insulation material is of sufficient thickness to insulate the resistance element 16 from the test part when the gauge is mounted thereto.

The insulation means used may comprise a resinous enamel such as that sold under the trade name "Formex" or equivalent material which can be baked or cured on the resistance element. The gauge need not be coated with a material which must be heated to set the same for, actually, any resinous material or the like carried in a vehicle which will air harden can be used to form the protecting insulating sheath.

The resistance element could be merely dipped into the material to form the sheath after lead wires had been suitably secured to the resistance element. As the material used will tend to adhere to the defining edges of the slots formed during the punching operation and fill the slots, the coating material will also reinforce the resistance element.

Figure 3:
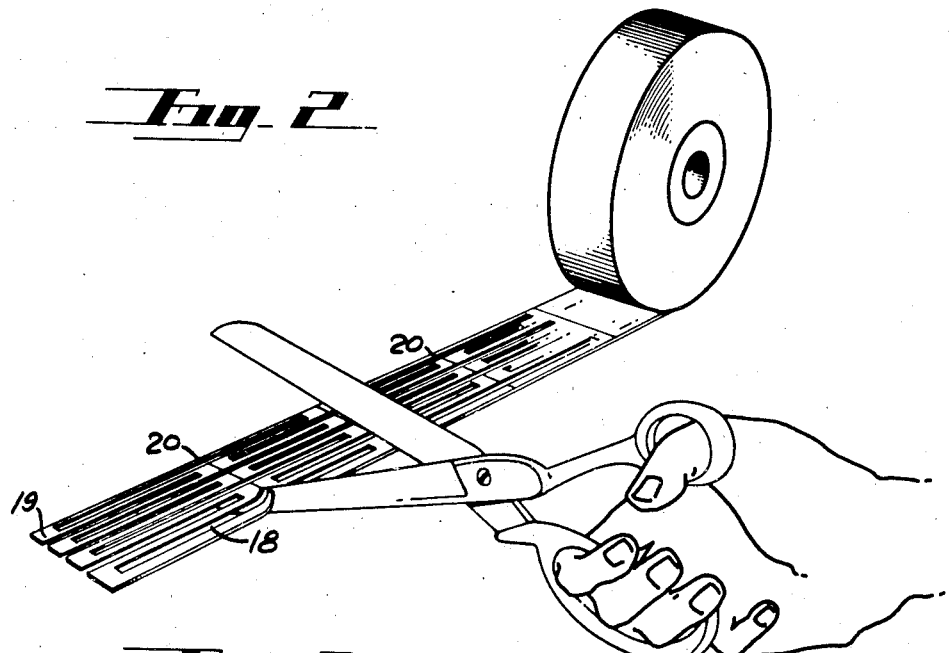
Figure 3 is a perspective view of another form of the gauge of the present invention showing a step in the manufacture thereof.

Although the gauge illustrated in Figure 1 is preferably formed from an individual sheet of material, gauges may be formed, referring now to Figure 3, by punching or otherwise removing aligned rows of substantially parallel overlapping slots 18 in an elongate band of material 19. Individual gauges may be formed by transversely severing the band at spaced lines 20 of demarkation formed on the band either at the time the slots are punched therefrom or at some subsequent operation. In this form of the present invention the band 19, after the slots have been deformed therein, may be rolled and the band stored in this condition until gauges are required. As the thickness of the band 19 is of the order of 1/1000 of an inch thick, individual gauges may be severed from the band by an ordinary pair of scissors as shown in Figure 3.

Figure 4:
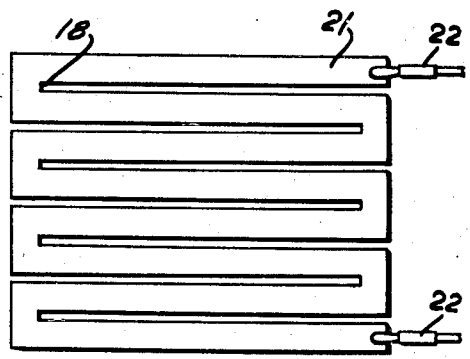
Figure 4 is a top plan view of another form of the gauge of the present invention.

It will be seen, referring now to Figure 4, that when the band is severed along the lines 20 a gauge such as shown in the figure referred to results. This gauge, in the broadest aspect thereof, comprises a sheet 21 having the plurality of substantially parallel slots 18 alternately opening onto opposite edges of the sheet. After the individual gauge has been severed from the band, lead wires 22 are secured to the opposite ends of the substantially zigzag path of resistance formed. The gauge thus formed may be mounted to a test part in the same manner as earlier described in connection with the gauge shown in Figure 1.

Figure 6:
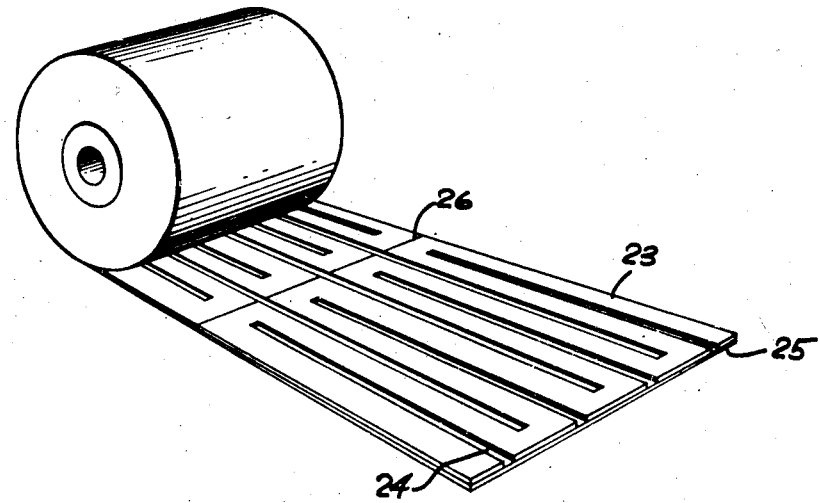
Figure 6 is another view in perspective showing a still further modified form of the gauge.

If desired, referring now to Figure 6, the band 23 in which are formed the aligned rows of substantially parallel overlapping slots 24 may be coated on the one surface thereof with some suitable backing material 25. Although the material 25 may consist of some suitable paper, in the preferred form of the invention this material comprises some relatively pliant thermoplastic material which can be softened and used to adhesively bond individual gauges to the test part. The material used preferably is one which will insulate the gauge from the test part when the same is mounted to the latter. This material 25, furthermore, should be one which will not chip or crack when the individual gauges are severed from the band as by cutting along the lines of demarkation 26.

The bond between the gauge of the present invention in all embodiments thereof and the test part is considerably better than the bond between the round resistance wire of prior gauges and the test part because of the relatively large flat area presented by the resistance element. This feature eliminates to a large extent slippage between the gauge and the test part heretofore experienced with the previously proposed gauges.

Although the now preferred embodiments of the present invention have been shown and described herein it is to be understood that the invention is not to be limited thereto for it is susceptible to changes in form and detail within the scope of the appended claims.

We claim:

1. An instrument of the type described comprising: a thin zigzag strip of material whose electrical resistance varies in accordance with changes of strain therein; lead wires electrically connected to the opposite ends of said strip; and an insulating sheath of thermoplastic material completely encasing said strip.

2. An instrument of the type described comprising: a flat, relatively thin strip of material whose electrical resistance varies in accordance with changes of strain therein, said strip having a width substantially greater than the thickness thereof and formed with a plurality of reversely bent courses; lead wires electrically connected to the opposite ends of said strip; and an insulating sheath of thermoplastic material completely encasing said strip.

3. A new article of manufacture comprising: an elongate band of conducting material whose electrical resistance varies in accordance with the strain therein, said band being formed with a plurality of rows of substantially parallel overlapping slots; and spaced transverse lines of demarkation formed on said band forming guide lines for separation of said band into elongate substantially zigzag paths of resistance.

4. A new article of manufacture comprising: an elongate band of conducting material whose electrical resistance varies in accordance with the strain therein, said band being formed with a plurality of aligned rows of substantially parallel overlapping slots extending longitudinally of said band; and spaced transverse lines of demarkation formed on said band forming guide lines for separation of said band into elongate substantially zigzag paths of resistance.

5. A new article of manufacture comprising: an elongate band of conducting material whose electrical resistance varies in accordance with the strain therein, said band being formed with a plurality of aligned rows of substantially parallel overlapping slots extending longitudinally of said band; spaced transverse lines of demarkation formed on said band forming guide lines for separation of said band into elongate substantially zigzag paths of resistance; and a layer of flexible, insulating material carried by the one face of said band.

6. The method of forming an instrument of the type described comprising, the steps of: forming a substantially zigzag path of resistance by forming a plurality of slots alternately opening on opposite edges of a thin sheet of conducting material, the electrical resistance of which varies in accordance with the strain therein; attaching lead wires to the opposite ends of said path; and thereafter encasing said sheet in an insulating sheath.

7. The method of forming an instrument of the type described comprising, the steps of: removing elongate portions from a thin sheet of conducting material whose electrical resistance varies in accordance with the strain therein to form an elongate path of resistance having a substantially zigzag course; attaching lead wires to the opposite ends of said course; and thereafter bonding to at least one face of said sheet a layer of insulating material.

8. The method of forming an instrument of the type described comprising the steps of: cutting from a thin sheet of conducting material the resistance of which varies in accordance with the strain therein a plurality of substantially parallel elongate strips to form a plurality of overlapping slots in said sheet; removing an elongate transverse section from said sheet to join at least some of said slots to form an elongate resistance path having a substantially zigzag course; and thereafter attaching lead wires to the opposite ends of the resistance path thus formed.

9. The method of forming a new article of manufacture of the type described comprising the steps of: forming in an elongate band of conducting material the resistance of which varies in accordance with the strain therein a plurality of rows of substantially parallel over lapping slots; and thereafter rolling said band upon itself for ease of handling and storage.

10. The method of forming a new article of manufacture of the type described comprising the steps of: forming in an elongate band of conducting material the resistance of which varies in accordance with the strain therein a plurality of rows of substantially parallel overlapping slots; bonding to at least one face of said band a strip of an insulating material sufficiently flexible to permit said band to be formed into a roll; and thereafter rolling said band upon itself for ease of handling and storage.

11. The method of forming a new article of manufacture of the type described comprising the steps of: forming in an elongate band of conducting material the resistance of which varies in accordance with the strain therein a plurality of rows of substantially parallel overlapping slots; forming spaced, transverse lines of demarkation on said band intermediate the adjacent ends of at least a portion of said slots; and thereafter rolling said band upon itself for ease of handling and storage.

12. A new article of manufacture, comprising: an elongate band of conducting material whose electrical resistance varies in accordance with the strain therein, said band being formed with a plurality of lines of slots extending longitudinally of the band, the lines being spaced transversely of the band and each line comprising a plurality of aligned slots mutually spaced longitudinally at their longitudinally adjacent extremities, the slots in adjacent lines being relatively staggered whereby to enable the adjacent overlapping portions of transversely adjacent slots to define, alternately longitudinally and transversely of the said band, solid areas extending in serpentine configuration transversely of said band.

13. A new article of manufacture, comprising: an elongate band of conducting material the electrical resistance of which varies in accordance with the strain therein, said band being formed with a plurality of lines of slots extending longitudinally of the band, the lines being spaced transversely of the band and each line comprising a plurality of aligned slots mutually spaced longitudinally at their longitudinally adjacent extremities, the longitudinal spacing between said longitudinally adjacent extremities of the slots of alternate lines of slots defining, between said alternate lines of slots, imperforate areas extending longitudinally and transversely of the band, the transverse aggregate of said imperforate areas establishing transversely elongate longitudinally spaced areas contrasting visually with the longitudinally adjacent portions of said band to indicate guide areas for transverse severance of said band into a plurality of elongate paths of resistance, each having a substantially serpentine course.

14. A new article of manufacture, comprising: an elongate band of conducting material whose electrical resistance varies in accordance with the strain therein, said band being formed with a plurality of lines of slots extending longitudinally of the band, the lines being spaced transversely of the band and each line comprising a plurality of aligned slots mutually spaced longitudinally at their longitudinally adjacent extremities, the slots in adjacent lines being relatively staggered whereby to enable the adjacent overlapping portions of transversely adjacent slots to define alternately longitudinally and transversely of the said band, solid areas extending in serpentine configuration transversely of said band; and a band of flexible insulating material of a width equal to the width of the band of conducting material bonded to the one face of the latter.

15. A new article of manufacture, comprising: an elongate band of conducting material the electrical resistance of which varies in accordance with the strain thereon, said band being formed with a plurality of lines of slots extending longitudinally of the band, the lines being spaced transversely of the band and each line comprising a plurality of aligned slots mutually spaced longitudinally at their longitudinally adjacent extremities, the longitudinal spacing between said longitudinally adjacent extremities of the slots of alternate lines of slots defining, between said alternate lines of slots, relatively small imperforate areas extending longitudinally and transversely of the band, and the transverse aggregate of said areas establishing relatively large, transversely elongate areas spaced longitudinally of said band, the latter areas being demarked at their longer sides by the transversely aligned adjacent extremities of said alternate lines of slots and demarked at their shorter sides by the opposite longitudinal edges of said band, the thus-demarked portions of said band constituting areas contrasting visually with the longitudinally adjacent portions of said band operative to indicate severance regions for subdividing said band transversely into a plurality of transversely serpentine resistance-paths.

WILLIAM D. VAN DYKE.
PAUL A. DENNIS.

REFERENCES CITED

The following references are of record in the file of this patent:

UNITED STATES PATENTS

| Number | Name | Date |
| --- | --- | --- |
| 1,975,410 | Simpson | Oct. 2, 1934 |
| 2,058,946 | Becker | Oct. 27, 1936 |
| 2,102,302 | Arnold | Dec. 14, 1937 |
| 2,334,668 | Conner | Nov. 16, 1943 |